United States Patent
Schwartz

(12) United States Patent (10) Patent No.: US 6,837,536 B1
(45) Date of Patent: Jan. 4, 2005

(54) AERODYNAMIC UNDERBODY DEVICE FOR TRAILER (AND BOX-TRUCK)

(76) Inventor: Karl John Schwartz, 2467 Clover Blossom Ct., Grove City, OH (US) 43123

( * ) Notice: Subject to any disclaimer, the term of this patent is extended or adjusted under 35 U.S.C. 154(b) by 5 days.

(21) Appl. No.: 10/465,257

(22) Filed: Jun. 20, 2003

(51) Int. Cl.$^7$ ............................................. B62D 35/02
(52) U.S. Cl. .............................. 296/180.4; 296/180.1; 296/181.5; 296/182.1; 296/184.1
(58) Field of Search ......................... 296/180.1, 180.2, 296/180.4, 181.5, 182.1, 184.1

(56) References Cited

U.S. PATENT DOCUMENTS

| | | | | |
|---|---|---|---|---|
| 3,743,343 A | * | 7/1973 | Grote et al. ................ | 280/851 |
| 3,869,617 A | * | 3/1975 | Gaussoin et al. ........... | 280/851 |
| 4,746,160 A | * | 5/1988 | Wiesemeyer ............... | 296/180.2 |
| 4,938,524 A | * | 7/1990 | Straub et al. .............. | 296/184.1 |
| 5,280,990 A | * | 1/1994 | Rinard ..................... | 296/180.1 |
| 5,375,882 A | * | 12/1994 | Koch, III ................... | 280/851 |
| 5,417,453 A | * | 5/1995 | VanDenberg ............... | 280/785 |
| 5,823,610 A | * | 10/1998 | Ryan et al. ............... | 296/180.4 |
| 5,921,617 A | * | 7/1999 | Loewen et al. ........... | 296/180.4 |
| 6,361,061 B1 | * | 3/2002 | Lea .......................... | 280/414.1 |
| 6,485,087 B1 | * | 11/2002 | Roberge et al. .......... | 296/180.5 |
| 6,644,720 B2 | * | 11/2003 | Long et al. ............... | 296/180.4 |

* cited by examiner

*Primary Examiner*—D. Glenn Dayoan
*Assistant Examiner*—Greg Blankenship
(74) *Attorney, Agent, or Firm*—Neal T. Hauschild

(57) ABSTRACT

A belly pan, or membrane of rigid yet flexible material is of elongated shaped outline to be mounted along the bottom of tractor-trailer to improve the aerodynamic performance. The belly pan is provided with a tapered front portion to be attached to the frontal portion of the trailer to the approximate location of the truck hitch. The belly pan extends rearwardly, under the trailer, between the rear wheels in a rectangular portion and the rearward edge is affixed to the ICC bumper of the trailer. An aerodynamic shaped deflector is attached to the frontal portion of the landing gear of the trailer and attaches to the belly pan for reducing drag between the underside of the trailer and the support beams of the landing gear. A similar aerodynamic shaped deflector is attached to the frontal portion of the ICC bumper and attached to the belly pan for reducing drag between the underside of the trailer and the beams of the ICC bumper.

15 Claims, 4 Drawing Sheets

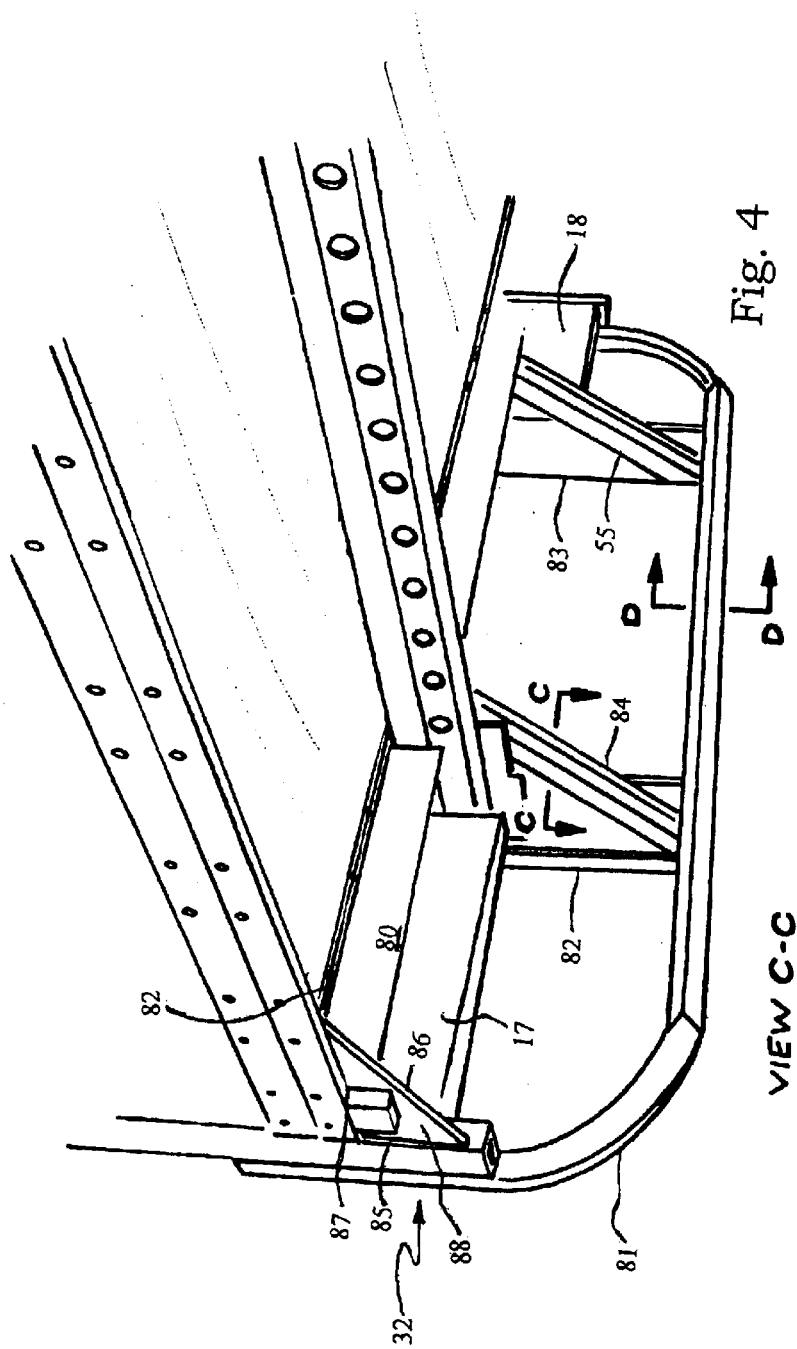
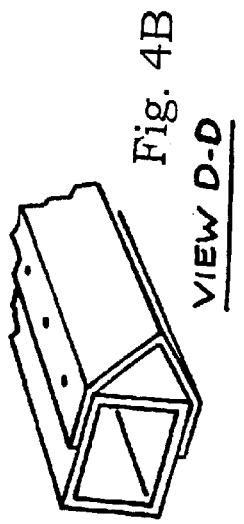
Fig. 4
Fig. 4A VIEW C-C
Fig. 4B VIEW D-D

AERODYNAMIC UNDERBODY DEVICE FOR TRAILER (AND BOX-TRUCK)

CROSS-REFERENCE TO RELATED APPLICATION

Not Applicable

STATEMENT REGARDING FEDERALLY SPONSORED RESEARCH OR DEVELOPMENT

Not Applicable

REFERENCE TO SEQUENCE LISTING

Not Applicable

BACKGROUND OF THE INVENTION

The present invention relates generally to the field of a device for improving the aerodynamic performance of a tractor-trailer thereby increasing fuel efficiency and more particularly to an underbody device for reducing wind or air resistance drag of the undercarriage of a trailer of a truck to enhance fuel economy.

The problem of increased fuel consumption of a truck pulling a tractor-trailer resulting from air resistance or drag at increased speed is well known. The problem has been addressed in a number of ways or approaches by the prior art in reference to the combination of the truck and the trailer positioning, and the rear of the trailer. None of the offered solutions has addressed the wind resistance from the undercarriage of the trailer including the coefficient of drag of the landing gear assembly and the ICC bumper permanently affixed to the trailer.

U.S. Pat. No. 2,126,943 to Best is entitled "Motor Vehicle" and discloses a conventional motor vehicle with improvements tending to reduce wind resistance to movement of vehicle bodies. The disclosed apparatus includes a flat, uninterrupted lower body surface with steerable road wheels partially housed within the body. The wheel pockets incorporating closure members or fairings that are coplanar with the underbody panel.

BRIEF SUMMARY OF THE INVENTION

The device of the present invention provides an air drag reducing belly pan and air deflecting attachments to structural components of the underside of a trailer and box-trucks to enhance fuel economy. The conventional underside of a trailer consists of a series of equally spaced I-beams laterally spaced to support the floor and cargo of the trailer. Attached to the structure of the trailer include a landing gear assembly and an ICC bumper typically formed of square-shaped structural components allowing for a large frontal area exposed to oncoming air flow. The device of the present invention minimizes the frontal area exposed to direct air flow of the undercarriage I-beams and the structural attachments such as the landing gear and the ICC bumper during trailer movement. By reducing the fontal area of horizontal and vertical surfaces of the underside of a trailer by attaching a device consisting of a streamlined belly pan and air deflectors for the landing gear and the ICC bumper, air drag resistance will be reduced and fuel efficiency will be increased.

An object of the present invention is to provide a new and improved air drag reducing device for the underside of a trailer and box-trucks.

Another object of the present invention is to provide a new and improved air drag reducing device that may be conveniently installed on existing trailers and box-trucks.

BRIEF DESCRIPTION OF THE DRAWINGS

FIG. 3A is an sectional view of the V-channel along the center line A—A;

FIG. 3B is an sectional view of the V-channel along the center line B—B;

FIG. 4 is a detailed front elevation perspective of the front of the ICC bumper deflector of FIG. 1;

FIG. 4A is an sectional view of the V-channel along the center line C—C;

FIG. 4B is an sectional view of the V-channel along the center line D—D.

DETAILED DESCRIPTION OF THE INVENTION

Figure 1:
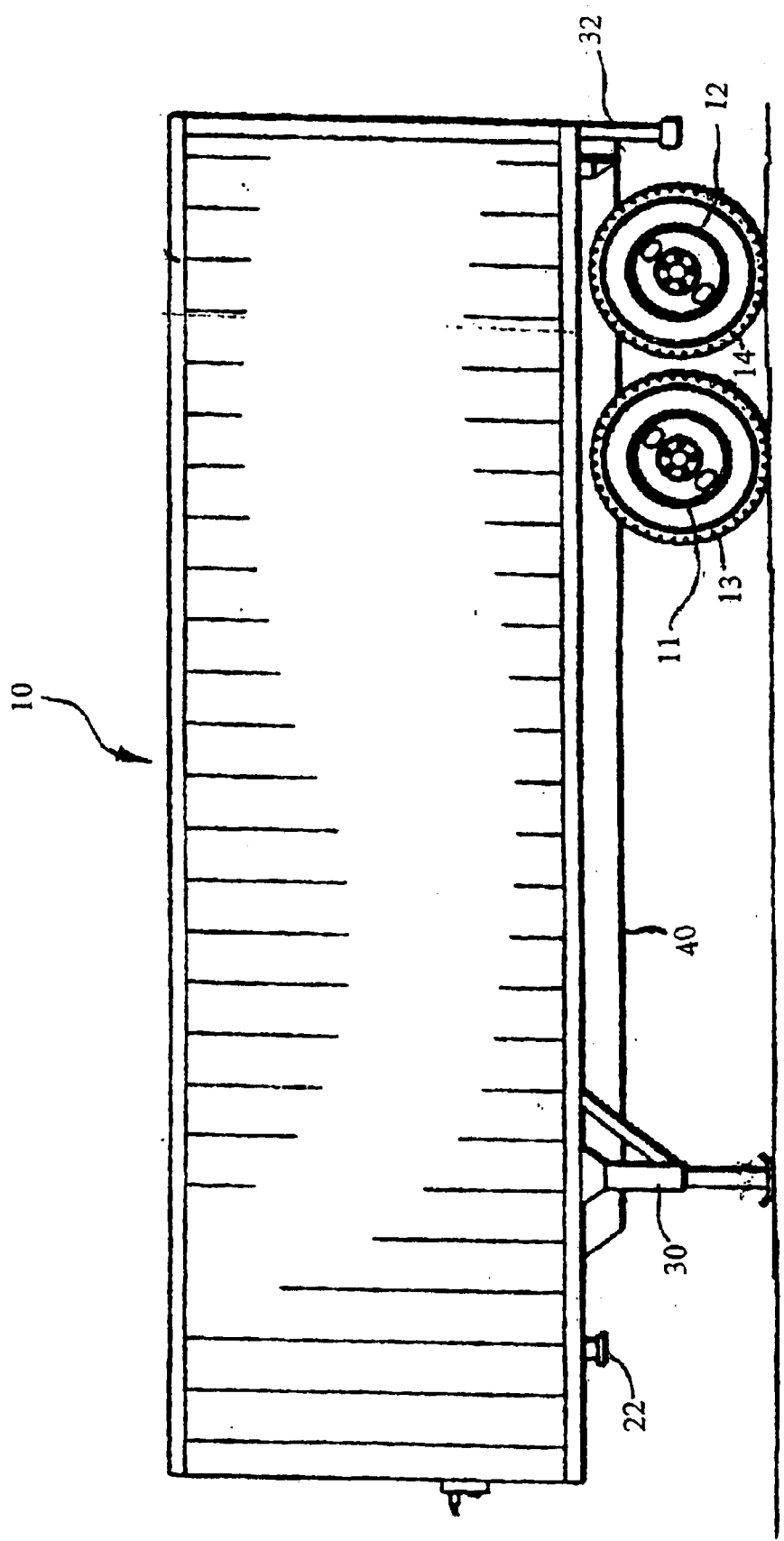
FIG. 1 is a side elevation view of a trailer cargo body including an embodiment of the deflector and belly pan of the present invention attached to the underside of the trailer and the front landing gear and the ICC bumper.
Figure 2:
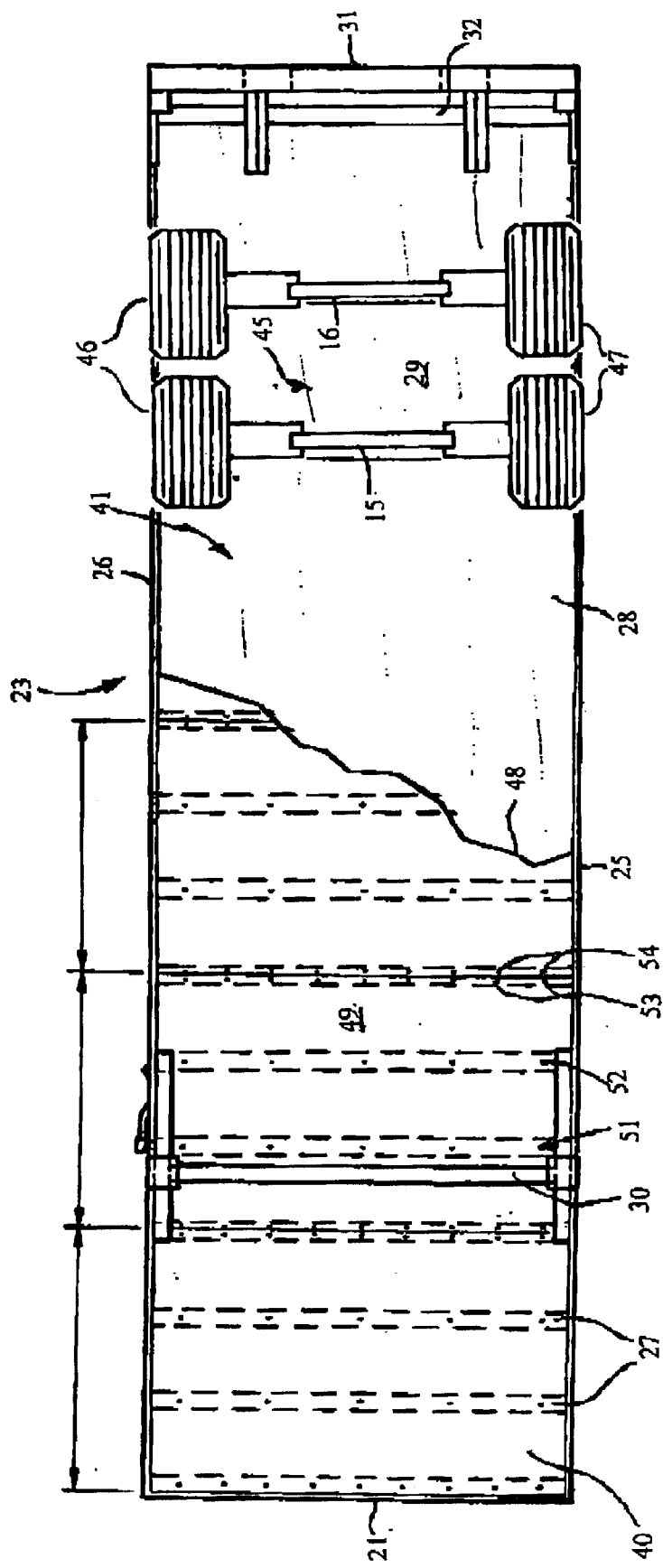
FIG. 2 is a horizontal perspective view of the underside of a trailer of FIG. 1 and the deflector attached to the landing gear and ICC bumper.

A typical elongated, eight wheel, double axel trailer 10 is shown diagrammatically in FIGS. 1 and 2, the trailer 10 having a two pairs of laterally spaced, rear wheels 11 and 12, with radial tires 13 and 14, the rear wheels having respective axles 15 and 16.

The trailer 10 is originally equipped with a metal front edge 21 and a truck/tractor hitch 22, and laterally spaced I-beams 27 forming the elongated undercarriage 23 with parallel side edges of a left side 25 and a right side 26, leaving the undercarriage 23 exposed to air traveling from the front edge 21 of the trailer 10 to the rear edge 31. The trailer 10 is equipped with a landing gear 30 located to the rear of the truck hitch 22 which is attached to the I-beams 27 and centered between left side 25 and right side 26. The trailer 10 is equipped with an ICC bumper 32 located in front of the rear edge 31 centered between left side 25 and right side 26.

Figure 3:
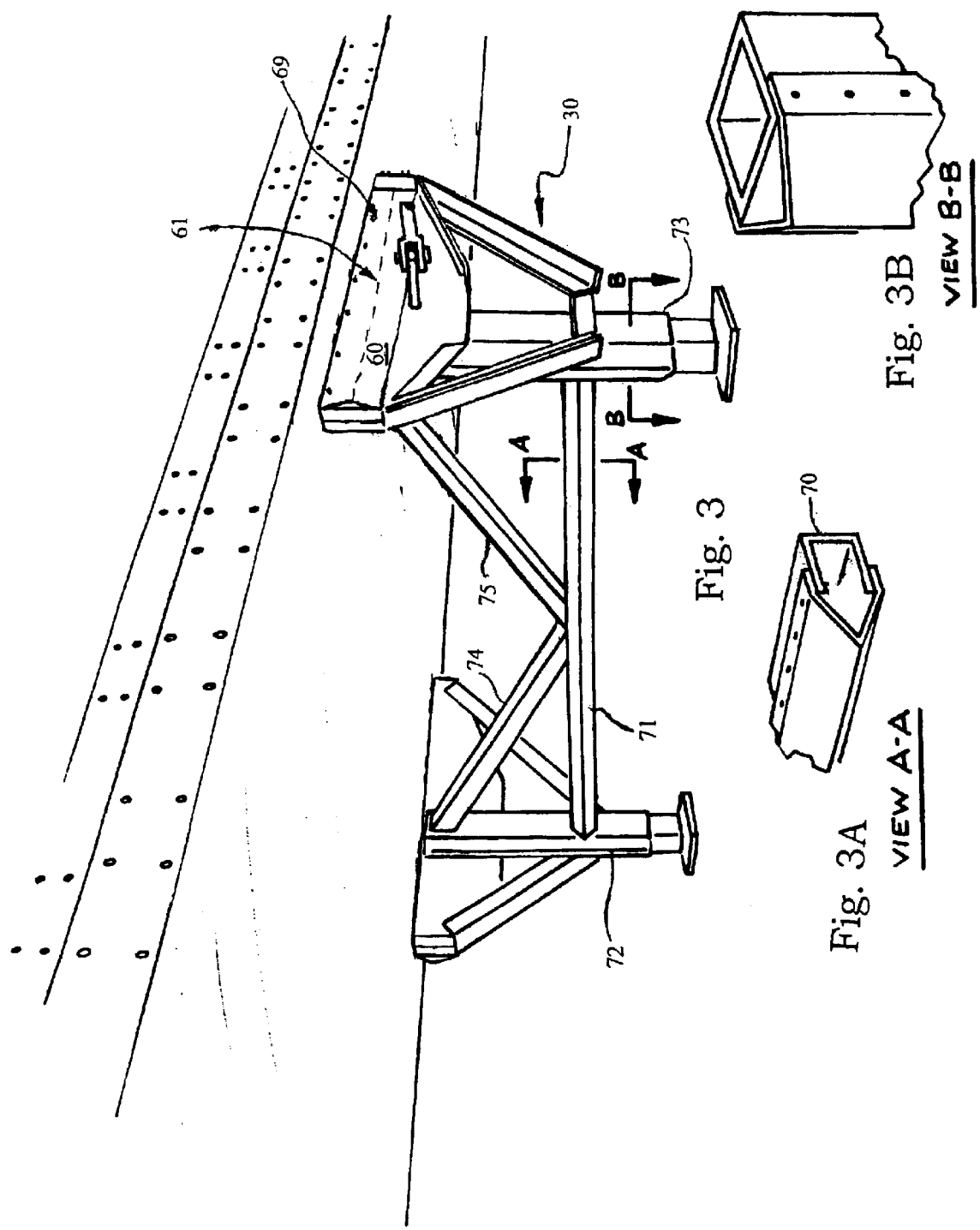
FIG. 3 is a detailed front elevation perspective view of the front of the landing gear deflector of FIG. 1.

As shown diagrammatically in FIG. 3, FIG. 3A and FIG. 3B, landing gear 30 is formed by a horizontal C-channel beam 71 affixed to an I-beam 27. Vertical C-channel beams 72 and 73 are affixed to the horizontal C-channel beam 71. A pair of angle support brackets 74 and 75 are affixed to the vertical C-channel beams 72, 73 and protrude upwardly and rearwardly at a predetermined angle to an I beam 27.

As shown diagrammatically in FIG. 4, FIG. 4A and FIG. 4B, ICC bumper 32 is formed by a horizontal square beam 81 affixed to an I-beam 27 at the rear edge 31. Vertical square beams 82 and 83 are affixed to the horizontal square beam 81. A pair of angle support brackets 84 and 55 are affixed to the outer sides of vertical square beams 82, 83 and support the tail light casings 17 and 18 of the trailer 10.

As shown diagrammatically in FIG. 2, the elongated, removable, belly pan 40 of the invention is formed of relatively light in weight material 49, with minimal thickness 48 capable of diverting air from the undercarriage 23 and exposed I-beams 27 as well as resisting impact, shock, and cuts to a high degree. Belly pan 40 comprises an elongated body 41 of uniform thickness, and adapted to underlie the undercarriage 23 from the front edge 21 and truck hitch 22 to the rear edge 31 and ICC bumper 32 to substantially be co-extensive in length with the length of the exposed undercarriage 23, and from the left side 25 and the right side 26 so as to substantially fill the space 28 between the left side 25 and the right side 26 and substantially coextensive in width with the space 29 between the laterally spaced wheels. Space 29 is formed by a pair of oppositely disposed, identical, arcuate, cut-outs 46 and 47, forming a neck, 45, of reduced lateral dimension, the cut-outs providing space for left and right pairs of rear wheels 11 and 12. The belly pan 40 thus comprises a rearward, horizontal, portion of rectangular configuration extending from the ICC bumper 32 forwardly to beyond the landing gear 30 to the truck hitch 22 and of predetermined, substantially uniform, width, with parallel side edges 25 and 26, to cover the major part of the exposed undercarriage 23.

The belly pan 40 is removably affixed by threaded fasteners 51 to the I-beams 27. Two longitudinally extending rows 53 and 54 of screw holes such as 52 are provided for the threaded fasteners 51 being removably affixed to the I-beams 27, the rows of holes permitting adjustment in case am portion of the belly pan 40 is damaged and misaligned.

A landing gear deflection plate 60 includes a top horizontal V-channel 61 having holes 69 through which suitable threaded fasteners provide mounting thereof on the horizontal C-channel beam 70 and a pair of vertical V-channels. The top end of the vertical V-channels are connected by threaded fasteners to the horizontal V-channel and are connected to the vertical C-channel beams to cover the concave channel allowing air to be deflected from the interior portion of the channel to around the channel and to the rear of the trailer 10.

An ICC bumper deflection plate 80 includes a downwardly rearwardly extending plate 88 affixed by a flange 82 to the belly pan 40 with threaded fasteners. Triangular side panels 83 and 84 are affixed to the tail light casings 17 and 18 along the leading edge 85, affixed to the extending plate 81 along the hypotenuse 86 and the top-most edge 87 to the belly pan 40 to reduce the direct surface area of the tail light casings 17 and 18 and deflect the air flow from ICC bumper 32.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device to be connected to an underside of a trailer having a landing gear assembly positioned at a front of said trailer and an ICC bumper positioned at a rear of said trailer comprising:

a belly pan formed of a structural material having sufficient rigidity removably affixed to said underside, said pan being substantially co-extensive in width and length of said trailer, having a horizontal, main body;

a pair of laterally-projecting, integral flaps, each for covering and diverting air around said ICC bumper and said landing gear;

a connecting means for connecting said device to said trailer underside.

2. A device as in claim 1, wherein said belly pan includes at least one member plate.

3. A device as in claim 1, wherein said belly pan includes a plurality of member plates with a leading edge and said plurality of plates are connected by a fastener to each other.

4. A device to be connected to an exposed underside of a trailer, said underside of said trailer having a series of lateral I-beams between a truck hitch positioned at a front end of said trailer and an ICC bumper having a fore side and an aft side at a rear end of said trailer with a landing gear having a fore side and an aft side attached to said underside at the front of said trailer and a front pair of laterally-spaced drive wheels positioned behind said landing gear and a rear pair of laterally-spaced drive wheels positioned in front of said ICC bumper, said device comprising:

a belly pan formed of a structural material having sufficient rigidity removably affixed to said underside, said pan being substantially co-extensive in width of said trailer, having a horizontal, main body extending from said truck hitch rearwardly to said ICC bumper to cover said exposed underside;

a pair of laterally-projecting, removably affixed flaps, each for covering and diverting air around said ICC bumper and said landing gear;

wherein said flaps include for base for mounting to said belly pan; an angled front face downwardly and rearwardly extending from the base, a lower face of said flaps rearwardly extending and with the angled front face defining an angle less than 180 degrees; a connecting means for connecting said lower face to a leading edge of said ICC bumper or said landing device.

5. A device as in claim 4, wherein said belly pan includes at least one member plate.

6. A device as in claim 4, wherein said belly pan includes a plurality of member plates with a leading edge and said plurality of plates are connected by a fastener to each other.

7. A combination of a trailer and a device to be connected to an exposed underside of said trailer, said underside of said trailer having a series of lateral I-beams between a truck hitch positioned at a front end of said trailer and an ICC bumper having a fore side and an aft side at a rear end of said trailer with a landing gear having a fore side and an aft side attached to said underside at the front of said trailer and a front pair of laterally-spaced drive wheels positioned behind said landing gear and a rear pair of laterally-spaced drive wheels positioned in front of said ICC bumper, said device comprising:

a belly pan formed of a structural material having sufficient rigidly removably affixed to said underside, said pan being substantially co-extensive in width of said trailer, having a horizontal, main body extending from said truck hitch rearwardly to said ICC bumper to cover said exposed underside;

a landing gear deflector formed of a structural material having sufficient rigidity removably affixed to said landing gear;

an ICC bump deflector formed of a structural material having sufficient rigidity removably affixed to said ICC bumper.

8. A device as in claim 7, wherein said belly pan includes at least one member plate.

9. A device as in claim 7, wherein said belly pan includes a plurality of member plates with a leading edge and said plurality of plates are connected by a fastener to each other.

10. A device as in claim 7 wherein said landing gear deflector includes a pair of laterally spaced V-channels that extend downwardly from an angled face plate including an upwardly extending mounting flange for mounting thereof on said fore side of landing gear.

11. A device as in claim 7 wherein said landing gear deflector includes a pair of laterally spaced V-channels that extend downwardly from an angled face plate including an upwardly extending mounting flange for mounting thereof on said belly pan.

12. A device as in claim 7 wherein said ICC bumper defector includes a pair of laterally spaced guards having an exterior end and an interior end that extend downwardly and rearwardly from said belly pan including an upwardly extending mounting flange for mounting thereof on said fore side of ICC bumper.

13. A device as in claim 7 wherein said ICC bumper deflector includes a pair of laterally spaced guards having an exterior end and an interior end that extend downwardly and rearwardly from said belly pan in an upwardly extending mounting flange for mounting thereof on said belly pan.

14. A device as in claim 12 wherein each guard includes a pair of triangular plates secured to the exterior end and the interior end of said guard.

15. A device as in claim 13 wherein each guard includes a pair of triangular plates secured to the exterior end and the interior end of said guard.

* * * * *